(No Model.) 2 Sheets—Sheet 1.

D. F. LEHMAN.
BROADCAST SEEDER AND PLANTER.

No. 435,757. Patented Sept. 2, 1890.

Witnesses.
A. Ruppert,
G. B. Towles

Inventor.
David F. Lehman
Per
Thomas P. Simpson
Atty (No Model.) 2 Sheets—Sheet 2.

D. F. LEHMAN.
BROADCAST SEEDER AND PLANTER.

No. 435,757. Patented Sept. 2, 1890.

Witnesses.
A. Ruppert,
G. B. Towles

Inventor:
David F. Lehman
Per
Thomas P. Simpson
Atty

UNITED STATES PATENT OFFICE.

DAVID F. LEHMAN, OF ROCKFORD, IOWA.

BROADCAST SEEDER AND PLANTER.

SPECIFICATION forming part of Letters Patent No. 435,757, dated September 2, 1890.

Application filed May 26, 1890. Serial No. 353,261. (No model.)

*To all whom it may concern:*

Be it known that I, DAVID F. LEHMAN, a citizen of the United States, residing at Rockford, in the county of Floyd and State of Iowa, have invented certain new and useful Improvements in Broadcast Seeders and Planters; and I do hereby declare the following to be a full, clear, and exact description of the invention, such as will enable others skilled in the art to which it appertains to make and use the same.

This invention relates to seeders and planters for broadcast sowing; and it consists in certain improvements in the construction of the same, as hereinafter described and claimed.

Figure 1:
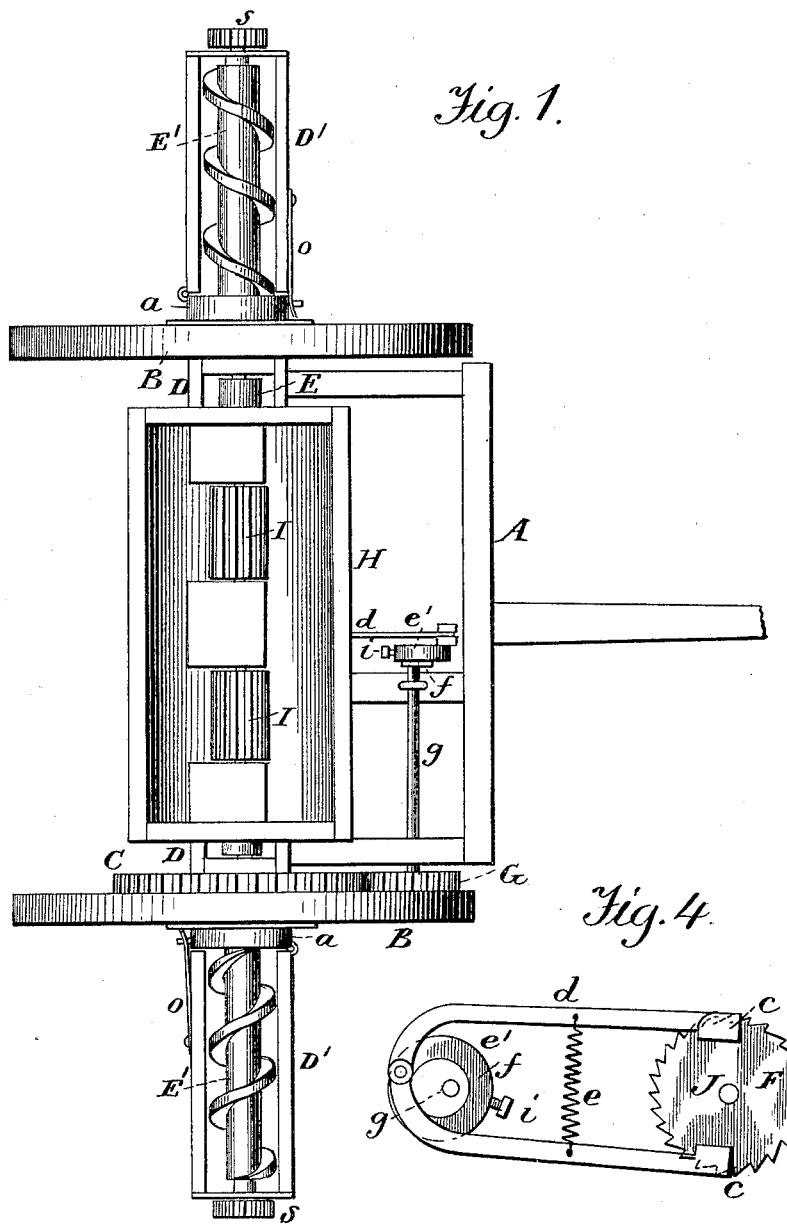
Figure 2:
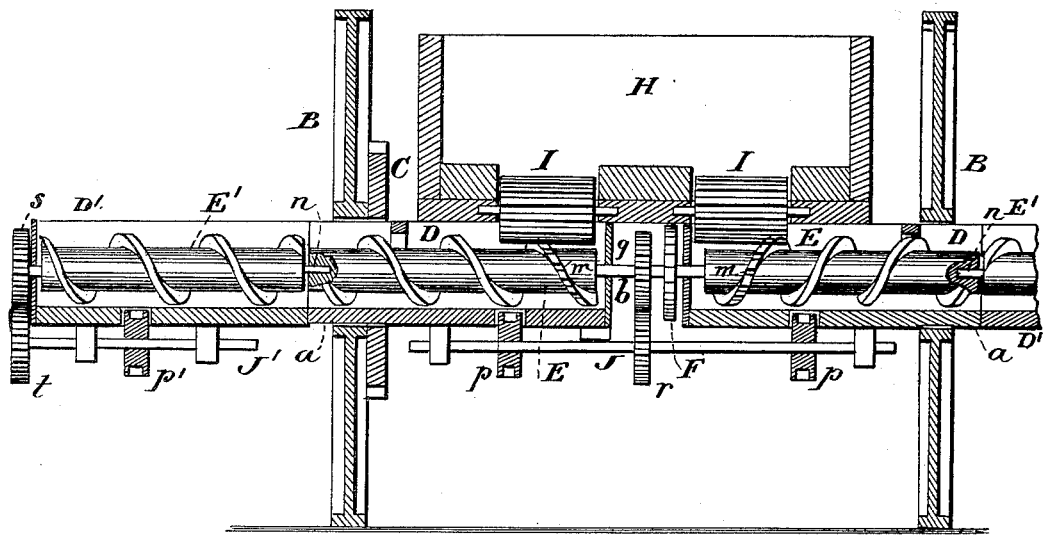
Figure 3:
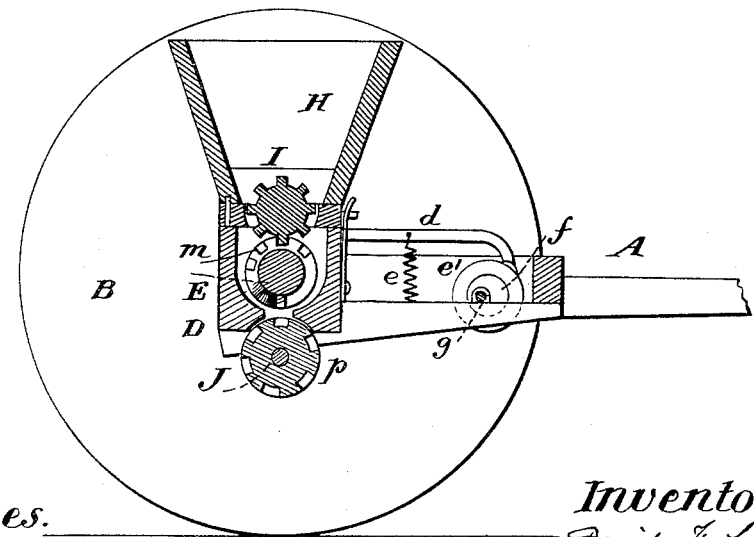

In the accompanying drawings, Figure 1 represents a plan view of a planter provided with my improvements, the hopper being shown removed from its position on the machine. Fig. 2 is a longitudinal section of a spiral conveyer and other details. Fig. 3 is a vertical section. Fig. 4 illustrates a ratchet-wheel and connections.

A designates the main frame, and B the carrying-wheels, one of which is a driving-wheel, and has secured thereto a gear-wheel C. The connected boxes D, extending from one wheel to the other, contain the spiral conveyers E, and also form the axle of the carrying-wheels, the said boxes being provided with tubular extensions $a$ at their outward extremities, which serve as axle-spindles for the wheels B.

The conveyers E in the boxes D are connected at their inner ends by a shaft $b$, on which is fixed a ratchet-wheel F, through which intermittent rotary motion is imparted to the conveyers by means of the pawls $c$ on the ends of two arms or rods $d$. These rods $d$ converge at their outer ends, and are connected with an eccentric $f$ on one end of a rotary shaft $g$, having bearings in the frame. A spring $e$ connects the rods $d$ and serves to hold the pawls $c$ to the ratchet-wheel F. The eccentric $f$ has a ring or band $e'$ fitting on its periphery and adjustably secured thereto by a screw $i$. The rods $d$ are connected by a pin with said ring, and the latter may be adjusted so as to set the point of connection of said rods with the eccentric farther from or nearer to the shaft $g$ to lengthen or shorten the stroke of the pawls, and thus increase or lessen the quantity of seed sown per acre, as desired. On the opposite end of the shaft $g$ is a gear-wheel G, which engages with the wheel C on the driving-wheel B, and thus motion is imparted to the conveyers E through the ratchet and pawls above described.

The hopper H is mounted on the conveyer-boxes D and has two openings in the bottom, each opening forming a passage for seed to one of said boxes. Two grooved feeding-rollers I are journaled in the bottom of the hopper, one being in each of the said openings. The rollers I are actuated by the engagement therewith of the conveyers E, the spiral blade of each of said conveyers being provided with teeth, as seen at $m$, by which it engages one of said rollers and imparts thereto an intermittent rotary motion.

The conveyers E are constructed to convey the seed received from the hopper in opposite directions from the center of the machine, and each of said conveyers has an outward extension E', which is detachably connected therewith endwise by means of a tongue $n$, extending from one into an opening in the other part. A box D' is also provided for each of the conveyer-extensions E', the outer end of the extension being journaled in the outer end of its box. Each box D' is hinged at its inner end to the box D, or to its tubular extension $a$, and is provided with a catch $o$ for securing it to and in line with box D. When the conveyers are not in use, the boxes D' may be released and turned on their hinges to positions along the sides of the machine.

J indicates a shaft, which extends along under the conveyer-boxes D, and is mounted in bearings secured to said boxes. Two grooved feed-rollers $p$ are fixed to said shaft J, one being under each of the boxes D, and operate in slots or openings in the bottoms of said boxes to take the seed therefrom. Motion is imparted to the shaft J from the conveyer-shaft $b$ through gear-wheels $q$ and $r$ on said shafts.

A shaft J' is mounted in manner similar to shaft J under each of the boxes D', a feed-roller $p'$ being fixed to each shaft to take the seed from said boxes. Motion is imparted to each of the shafts J' through a gear-wheel s on the extended journal of conveyer E' and a gear-wheel t on shaft J'.

I claim—

1. The combination, with wheels B, of the conveyer-boxes D, having extensions D' connected therewith, spiral conveyers E, with extensions E' detachably connected therewith, shafts J and J', provided with feed-rollers in position to take seed from the conveyer-boxes, and driving mechanism, substantially as set forth and described.

2. The combination, with the spiral conveyers, of a ratchet-wheel, the rods d, provided with pawls in position to connect with said wheel, and an eccentric f, provided with an adjustable band e' and mounted on a rotative shaft having connection with driving mechanism, substantially as set forth and described.

In testimony whereof I have affixed my signature in presence of two witnesses.

DAVID F. LEHMAN.

Witnesses:
H. S. GRADY,
J. B. PARMENTER.